No. 774,793. PATENTED NOV. 15, 1904.
H. J. SHARP.
FRUIT PICKER.
APPLICATION FILED OCT. 14, 1903.
NO MODEL.
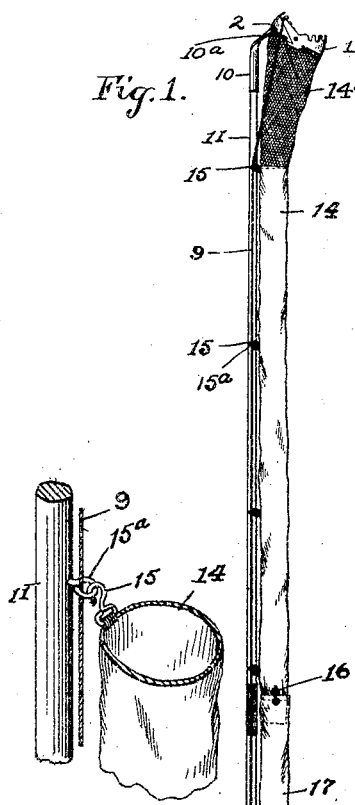
Fig. 1.
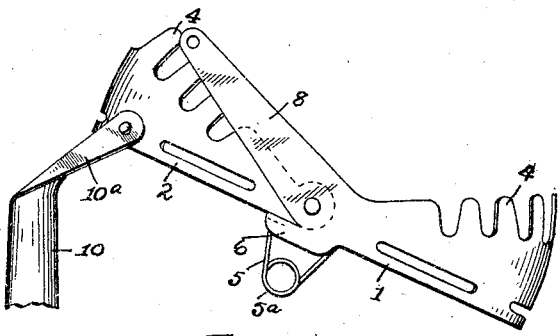
Fig. 2.
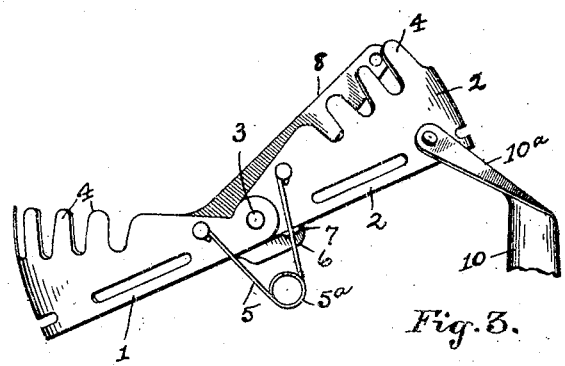
Fig. 3.
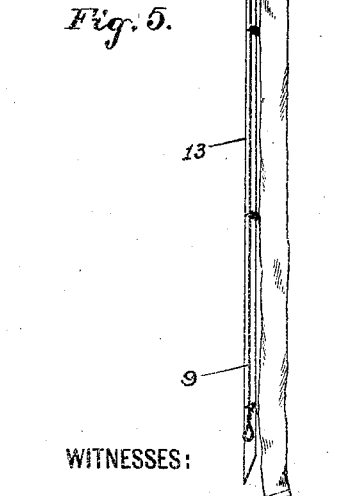
Fig. 5.
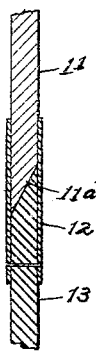
Fig. 6.
Fig. 4.
WITNESSES:
H. B. Bradshaw
A. L. Phelps
INVENTOR
Henry J. Sharp
BY
C. C. Shepherd
ATTORNEY No. 774,793.

Patented November 15, 1904.

UNITED STATES PATENT OFFICE.

HENRY J. SHARP, OF COLUMBUS, OHIO.

FRUIT-PICKER.

SPECIFICATION forming part of Letters Patent No. 774,793, dated November 15, 1904.

Application filed October 14, 1903. Serial No. 176,934. (No model.)

*To all whom it may concern:*

Be it known that I, HENRY J. SHARP, a citizen of the United States, residing at Columbus, in the county of Franklin and State of Ohio, have invented a certain new and useful Improvement in Fruit-Pickers, of which the following is a specification.

My invention relates to the improvement of fruit-pickers; and the objects of my invention are to provide a fruit-picking device of superior construction and arrangement of parts, to provide improved means for clipping or picking fruit from trees without injuring the fruit, to provide in conjunction therewith improved means for conducting the fruit to the ground or to a suitable receptacle, and to produce other improvements, the details of which will be more fully pointed out hereinafter.

These objects I accomplish in the manner illustrated in the accompanying drawings, in which—

Figure 1 is a view in elevation of my improved fruit-picking device, showing a two-section supporting-staff and fruit-conductor. Fig. 2 is a detail view in side elevation of the picker head or body. Fig. 3 is a similar view of the opposite side of said picker-head. Fig. 4 is a plan view of the picker-head with the members or jaws thereof partially closed. Fig. 5 is a detail view in perspective, illustrating the manner of connecting the flexible conductor with a staff-section; and Fig. 6 is a central vertical section through one of the joints of the staff.

Similar numerals refer to similar parts throughout the several views.

In carrying out my invention I employ a picker head or body comprising two opposing jaws 1 and 2, each of which is of a substantially curved yoke form and has its upper edge portion inclined toward its ends. These yoke-like jaws have their ends pivotally connected, as indicated at 3, the ends of the jaw 1 overlapping the ends of the jaw 2 at the pivot-points. Each of the jaws has its upper portion formed with inwardly bent or curved teeth 4, which gradually increase in length toward the center of the jaw. With corresponding sides of the jaws 1 and 2 and on opposite sides of one of their pivot-points 3 are connected the ends of a suitable spring 5, which may, as shown in the drawings, consist of a substantially V-shaped wire having one or more central spring-coils $5^a$. The tendency of the spring 5 is to throw the jaws 1 and 2 outward away from each other, and in order to limit the outward movement of said jaws I form one of the latter with a stop-lug 6, having a suitable shoulder or lip 7, which is adapted to engage the under side of the adjoining jaw when said jaws are thrown outward to the positions indicated in Figs. 2 and 3. The jaw 1 is provided on one side with an inclined arm extension 8, with which is adapted to be connected one end of an operating cord or wire 9.

As indicated in the drawings, the movement of the jaws toward each other on their pivots results in the toothed portions thereof describing arcs of circles, and in view of the fact that the jaw 2 is slightly smaller than the jaw 1 and that the teeth of the jaw 1 are so arranged as to insure their coming opposite the spaces between the teeth of the jaw 2 when the same are brought together the teeth of the jaw 1 will shear over the spaces of the opposite jaw.

With the outer side of the jaw 2 I connect the ends of the outwardly-inclined arms $10^a$ of a vertical socket-piece or tubular stem 10, this socket-piece being adapted to have detachably inserted therein the upper or outer end of a staff-section 11. The lower end of this staff-section terminates, as indicated at $11^a$ in Fig. 6, in an end bevel and is adapted to be inserted into the upper end of a tubular sleeve 12, which is secured to the upper end portion of a lower staff-section 13, the upper end of said lower staff-section being likewise beveled to meet the beveled portion $11^a$ of the upper staff-section, and thereby obviate any tendency of the staff-sections toward independent rotations. While but two of these sections are shown in the drawings, it will be understood that any desired number of such sections may be employed to gain the proper length.

Secured in connection with the lower edges of the jaws 1 and 2 is the upper end of the upper section of a tubular flexible fruit-conductor 14, the upper portion of said conductor being, as indicated at 14ª, preferably formed of netting or suitable open-work. This upper conductor-section 14 is, as shown, provided at intervals with hooks 15, which are adapted to be detachably engaged with eyepieces 15ª, which project from the staff-section, and the lower end of the upper conductor-section is, as shown, made to enter the upper end of the next lower conductor-section 17 and to be detachably connected therewith by suitable hooks, as indicated at 16. The section 17 is, as prescribed for the section 14, hooked at intervals into engagement with the staff-section 13. While but two of the conductor-sections are disclosed in the drawings, it is obvious that any desired number may be employed. The operating cord or wire 9 is, as indicated more clearly in Fig. 5 of the drawings, made to pass downward through the eyepieces.

In utilizing my invention for the purpose of picking fruit from trees—such as apples, pears, peaches, oranges, and similar fruit—the staff is raised until the fruit to be picked is between the jaws 1 and 2 or in position to be loosely embraced by the latter. The cord 9 is then pulled downward, resulting in a closing together of the jaws 1 and 2 over the fruit, the shearing of the teeth of one of said jaws over the spaces between the teeth of the opposite jaw resulting in the severing of the fruit-stem from the tree branch. As will readily be understood, the fruit which is thus picked will drop downward through the various sections of the flexible conductor and will be discharged from the lower end of the lower conductor-section. The release of the operating-cord, as will be readily understood, will result in the jaws again assuming the open position through tension of the spring 5. Owing to the employment of the open-work or netting section 14ª of the conductor, the operator will be able to view the fruit, and thus be advised as to whether or not the same is properly inclosed by the conductor-head.

From the construction and operation shown and described it will be seen that a comparatively simple and reliable fruit-picking device is provided which will be of great utility in picking fruit from trees and which, owing to the provision of the flexible conductor, may be utilized without bruising or injuring the fruit.

Having now fully described my invention, what I claim, and desire to secure by Letters Patent, is—

In a fruit-picker, a fixed jaw and a movable jaw pivotally connected, rounded teeth gradually increasing in length toward the center of the jaws projecting therefrom, resilient means for holding the jaws normally open, means for closing the jaws, means for supporting the fixed jaw, and means for conveying fruit to the ground.

HENRY J. SHARP.

In presence of—
C. C. SHEPHERD,
HOWARD T. MACKINLAY.